US012685691B2

(12) United States Patent
Marshall et al.

(10) Patent No.: US 12,685,691 B2
(45) Date of Patent: Jul. 21, 2026

(54) MINI MASSAGER WITH A REMOVABLE HANDLE

(71) Applicants: Chris Marshall, Ramona, CA (US); Jerry Tu, Diamond Bar, CA (US)

(72) Inventors: Chris Marshall, Ramona, CA (US); Jerry Tu, Diamond Bar, CA (US)

( * ) Notice: Subject to any disclaimer, the term of this patent is extended or adjusted under 35 U.S.C. 154(b) by 705 days.

(21) Appl. No.: 18/100,759

(22) Filed: Jan. 24, 2023

(65) Prior Publication Data

US 2024/0245575 A1 Jul. 25, 2024

(51) Int. Cl.
*A61H 23/00* (2006.01)
*A61H 15/00* (2006.01)
*A61H 23/02* (2006.01)

(52) U.S. Cl.
CPC ..... *A61H 23/0254* (2013.01); *A61H 15/0085* (2013.01)

(58) Field of Classification Search
CPC .. A61H 23/0254; A61H 23/00; A61H 23/004; A61H 23/006; A61H 15/0085; A61H 15/00
See application file for complete search history.

(56) References Cited

U.S. PATENT DOCUMENTS

| | | | | |
|---|---|---|---|---|
| 6,758,826 | B2 * | 7/2004 | Luettgen | A61H 23/0254 601/72 |
| 2006/0116614 | A1 * | 6/2006 | Jones | A61H 23/0263 601/80 |
| 2017/0106249 | A1 * | 4/2017 | Marton | A63B 21/00178 |
| 2020/0268594 | A1 * | 8/2020 | Pepe | A61H 15/0085 |
| 2020/0276079 | A1 * | 9/2020 | Cheng | A61H 23/0263 |
| 2021/0244316 | A1 * | 8/2021 | Khaled | A61H 23/00 |
| 2021/0244611 | A1 * | 8/2021 | Wersland | A61H 23/006 |
| 2022/0104997 | A1 * | 4/2022 | Lawrie | A61H 37/00 |
| 2022/0168177 | A1 * | 6/2022 | Vierheller | A61H 23/006 |
| 2022/0362097 | A1 * | 11/2022 | Hart | A61H 23/0254 |

* cited by examiner

*Primary Examiner* — Margaret M Luarca
*Assistant Examiner* — Sarah B Lederer

(57) ABSTRACT

A mini-massager device with a removable handle is disclosed. The device comprises a drive system, securely disposed inside the main body. The drive system comprises a spindle, which is rotatably connected to an electrical motor, and a drive shaft having a first end and a second end. The first end is movably connected to the spindle by connecting to one end of a movable arm and the second end is connected to a massage head, thereby enabling reciprocating motion for massaging the body of the user when the device is turned on. Batteries are disposed inside the main body for providing electrical power for operating the device. An elongated handle is detachably positioned on the main body of the device for enabling a user to conveniently hold the device, thereby effectively massaging the body using a massage head to significantly relax muscles, soothe nerves, improve cell metabolism, and muscle soreness.

15 Claims, 8 Drawing Sheets

MINI MASSAGER WITH A REMOVABLE HANDLE

BACKGROUND OF THE INVENTION

A. Technical Field

The present invention generally relates to a massage therapy product. More specifically, the present invention relates to a mini-massager provided with a removable hand, configured to enable a user to comfortably hold, thereby effectively massaging the body using multiple massage heads to relax muscles, soothe nerves, promote blood circulation, improve cell metabolism, and muscle soreness, significantly.

B. Description of Related Art

Handheld massagers for home use have become a very active field of inventions recently and are well known in the art. Such massagers include a handle attached to a massage head and driven by an electric motor with adjustments for intensity of the vibration. Currently, the handheld massagers are configured to use with a plurality of massage heads for providing different massaging effects and therapeutic experience for a user. The handheld massagers could be formed with different geometry and size, as well as differ in their material properties. The handheld massagers comprise a vibrator for vibrating the massaging head by rotating an eccentric flyweight or cam mounted within the head. While these types of massagers are suitable for providing a relaxing vibratory massage sensation for users.

A prior art DE3822394 assigned to Frenkel Walter, describes about a massaging device includes a massaging head that is coupled to the handle, where the fork shaped split handle having snap connection encloses the massage device housing in engaged position. The handle snap connection with pressure tabs is actuated to release the latch for disengaging the massage head from the handle. The massage head is set in rotation by a rotary motor with a connected gear, the rotary movement being controlled by a stepping mechanism with an adjustable pulse ratio from forward to reverse.

Another prior art KR101439200 assigned to Yun, Ja Weon, describes about a portable massage machine with massage unit is disposed at one end of the massage body and handle is disposed at other end of massage body. The handle member is detachably coupled to an end of the massage body using connection member. The connection member includes a press lock member to secure the handle to the massage body. Each component is made of a light synthetic resin material, so that the weight is lightened and the solenoid type elevating and lowering operation is performed smoothly.

However, the existing handheld massagers comprises vibrators and are hardly providing any massaging effect for the user's palm when the user holds the massager onto the body, and also it could not enable the user to safely hold and comfortably massage on any part of the user's body.

In light of the above-mentioned problems, there is a need for a mini-massager provided with a removable hand for enabling a user to conveniently and comfortably hold, thereby effectively massaging the body using a massage head to deep tissue massage, relax muscles, soothe nerves, promote blood circulation, improve cell metabolism, and muscle soreness, significantly. Further, there is also a need for a mini-massager configured to provide a new sense of stimulation by a reciprocating motion of a massage head provided at a distal end portion.

SUMMARY OF THE INVENTION

The present invention generally discloses a massage therapy product. Further, the present invention discloses a mini-massager provided with a removable hand, configured to enable a user to comfortably hold, thereby effectively massaging the body using a massage head to relax muscles, soothe nerves, promote blood circulation, improve cell metabolism, and muscle soreness, significantly.

In one embodiment, the mini-massager device comprises a massager head and an elongated handle. In one embodiment, the elongated handle is detachably attached to the massager head. In one embodiment, the mini-massager device is configured to enable a user to conveniently and comfortably hold, thereby effectively massaging the body using a massage head significantly to relax muscles, soothe nerves, promote blood circulation, improve cell metabolism, muscle soreness, relieving stress, reducing wrinkles and the like. In one embodiment, the mini-massager device could be used without using the elongated handle.

In one embodiment, the elongated handle is detachably positioned on the main body shell of the mini-massager device for enabling the user to conveniently and comfortably hold during massage. In some embodiments, the handle could be formed in various sizes and shapes. In one embodiment, the handle could be positioned from the top portion of the mini-massager device and locked to the main body shell via locking tabs. In one embodiment, the mini-massager device inserts into the handle from the top down. The handle comprises an opening at the center for receiving the main body shell from the top portion. In one embodiment, the opening has a diameter larger than the diameter of the main body shell. The handle is configured to enable the user to conveniently and comfortably hold the mini-massager device, thereby effectively massaging the body using the massage head. In one embodiment, the mini-massager device could be, but not limited to, a palm massager.

In one embodiment, the mini-massager device further comprises an indicator and a power switch/control switch. In one embodiment, the power switch/control switch is configured to enable the user to operate and control the mini-massager device. In one embodiment, the mini-massager device comprises a massage head, used to simply and conveniently apply massage on any desired part of the user's body, for example, a palm of the user. In one embodiment, mini-massager device is extremely stable in operation, inexpensive, simple to set up with minimal effort, small in size, functions efficiently, and reliably to massage any desired part of the user's body.

In one embodiment, the mini-massager device comprises a main body shell having an annular shaped structure and a drive system. In one embodiment, the drive system is securely disposed inside the main body shell. In one embodiment, the drive system further comprises a spindle/rotating spindle, a spindle arm, a drive shaft, and an electrical motor. In one embodiment, the spindle is rotatably connected to the electrical motor, which is securely and operatively disposed inside the main body shell. In one embodiment, the drive shaft having a first end and a second end, wherein the first end is securely and movably connected to the spindle by connecting to one end of a movable arm and the second end is connected to the massage head, thereby enabling reciprocating motion for massaging the body of the user, for example, user's palm.

In one embodiment, the mini-massager device further comprises one or more batteries, securely disposed inside the main body shell. The batteries are configured to provide electrical power for operating the mini-massager device. In one embodiment, the elongated handle is securely positioned and locked to the main body shell via locking tabs. In one embodiment, the massage head is securely and movably connected to the second end of the drive shaft of the mini-massager device via locking tabs. In some embodiments, the massage head is securely and movably connected to the second end of the drive shaft of the mini-massager device using one or more fasteners.

In one embodiment, the movable arm is configured to securely connect to the spindle and the drive shaft. In one embodiment, the drive shaft is configured to reciprocate in response to activation of the electrical motor. In one embodiment, the drive system is configured to convert the rotary motion of the electrical motor into reciprocating motion when the mini-massager device is turned on by the user using the power switch.

In one embodiment, the mini-massager device is provided with a printed circuit board (PCB). In one embodiment, the PCB board is configured to mechanically support the electrical connections and electrically connect the indicator, power switch/control switch, batteries, and the electrical motor using conductive tracks and wires.

In one embodiment, the drive system could convert the rotary motion of the electrical motor into reciprocating motion when the mini-massager device is turned on by the user using the power switch. The movable arm is securely and movably connected to the spindle at one end and the drive shaft at another end. In one embodiment, the movable arm may move through a predetermined range of reciprocation. In some embodiments, the movable arm could be adjustable through a variable range of reciprocation.

In one embodiment, the electrical motor could be, but not limited to, a brushless motor with a copper bushing. In one embodiment, the batteries could be, but not limited to, lithium batteries having a capacity range from about, but not limited to, 800 to 2000 mAh. In one embodiment, the batteries could be recharged by connecting to an electrical supply using a universal serial bus (USB) cable and an adapter. In one embodiment, the mini-massager device is further configured to operate at a rate ranges from at least, but not limited to, 1,000 to 3200 strokes per minute. In one embodiment, the mini-massager device could provide a stroke length ranges from about, but not limited to, 8 mm to 20 mm. In one embodiment, the mini-massager device is further configured to generate a stall force ranges from about, but not limited to, 3 lbs to 70 lbs. In one embodiment, the mini-massager device is further configured to efficiently operate at low noise less than, but not limited to, 70 dB at the operating speed of 2500 rpm.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
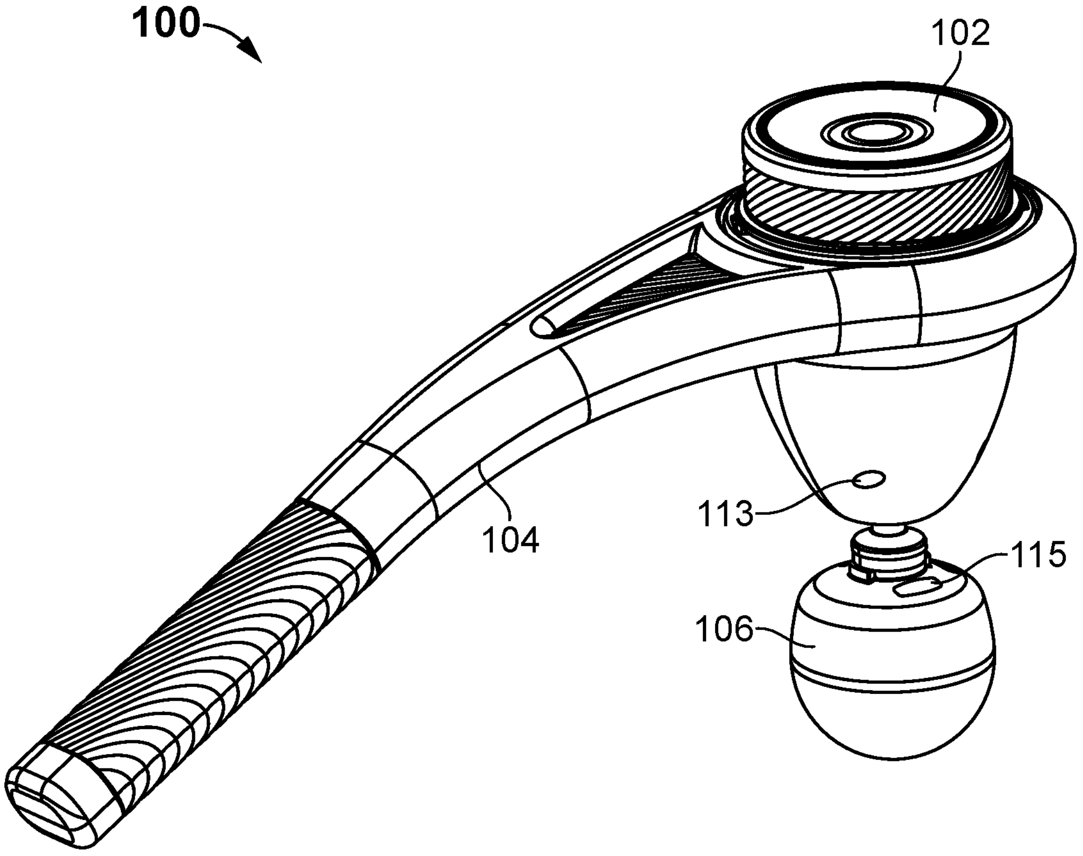
FIG. 1 show a front perspective view of a mini-massager device with a detachable elongated handle in an embodiment of the present invention.

Referring to FIG. 1, a mini-massager device 100 with a detachable elongated handle 104 in one embodiment is disclosed. The elongated handle 104 is attached to a massager head 102. In one embodiment, the elongated handle 104 is detachably attached to the massager head 102. In one embodiment, the mini-massager device 100 is configured to enable a user to conveniently and comfortably hold, thereby effectively massaging the body using a massage head 106 significantly to deep tissue massage, relax muscles, soothe nerves, promote blood circulation, improve cell metabolism, muscle soreness, relieving stress, reducing wrinkles and the like. In one embodiment, the mini-massager device 100 could be used without using the elongated handle 104. In one embodiment, the mini-massager device 100 could be, but not limited to, a palm massager. In one embodiment, the mini-massager device 100 is configured to be held easily in the user's palm and could be designed in different size, large or mini with a stroke length ranges from about, but not limited to, 8 mm to 20 mm. In one embodiment, the mini-massager device 100 is further configured to adjust the throw or the stroke length of the massaging head to work on larger or smaller muscle groups, or deeper or shallower points of stress or soreness in the muscles. In one embodiment, the mini-massager device 100 is further configured to enable the user to continuously adjust the massage intensity.

In one embodiment, the elongated handle 104 is detachably positioned on the main body shell 108 of the mini-massager device 100 for enabling the user to conveniently and comfortably hold during massage. In some embodiments, the handle 104 could be formed in various sizes and shapes. In one embodiment, the handle 104 could be positioned from the top portion of the mini-massager device 100 and locked to the main body shell 108 via locking tabs 120. In one embodiment, the mini-massager device 100 inserts into the handle 104 from the top down. The handle 104 comprises an opening at the center for receiving the main body shell 108 from the top portion. In one embodiment, the opening has a diameter larger than the diameter of the main body shell 108. The handle 104 is configured to enable the user to conveniently and comfortably hold the mini-massager device 100, thereby effectively massaging the body using the massage head 116. In one embodiment, the mini-massager device 100 allows quick massage within 1 hour at the speed of 2500 RPM. In one embodiment, the mini-massager device 100 uses, but not limited to, 1.6 v with lithium batteries have capacity ranges from about, but not limited to, 800 to 2000 mAh. In an exemplary embodiment, the weight of mini-massager device 100 with the handle 104 is lighter within a range from about, but not limited to, 0.056 kg to 1.07 kg.

In one embodiment, the mini-massager device 100 further comprises an indicator 113 and a power switch/control switch 115. In one embodiment, the indicator 113 is configured to indicate the battery level by illuminating in different colors. In one embodiment, the mini-massager device provides longest lasting battery up to, but not limited to, 5 hours and the battery status could be indicated with 3 to 10 different colors. In one embodiment, the user could adjust three customized speeds, 55 lb stall force, and quite noise free massage. In some embodiments, the mini-massager device 100 comprises a digital display screen. In one embodiment, the power switch/control switch 115 is configured to enable the user to operate and control the mini-massager device 100. In one embodiment, the mini-massager device 100 comprises a massage head 106, used to simply and conveniently apply massage on any desired part of the user's body, for example, a palm of the user. In one embodiment, mini-massager device 100 is extremely stable in operation, inexpensive, simple to set up with minimal effort, small in size, functions efficiently, and reliably to massage any desired part of the user's body.

Figure 2:
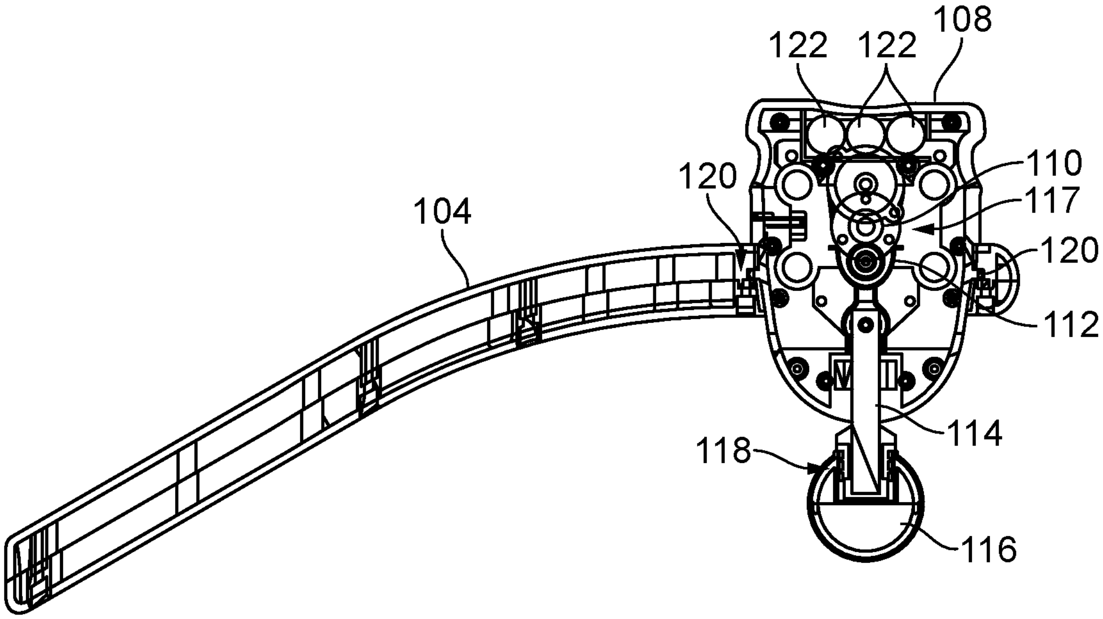
FIGS. 2-3 show sectional views of the mini-massager device in one embodiment of the present invention.
Figure 3:
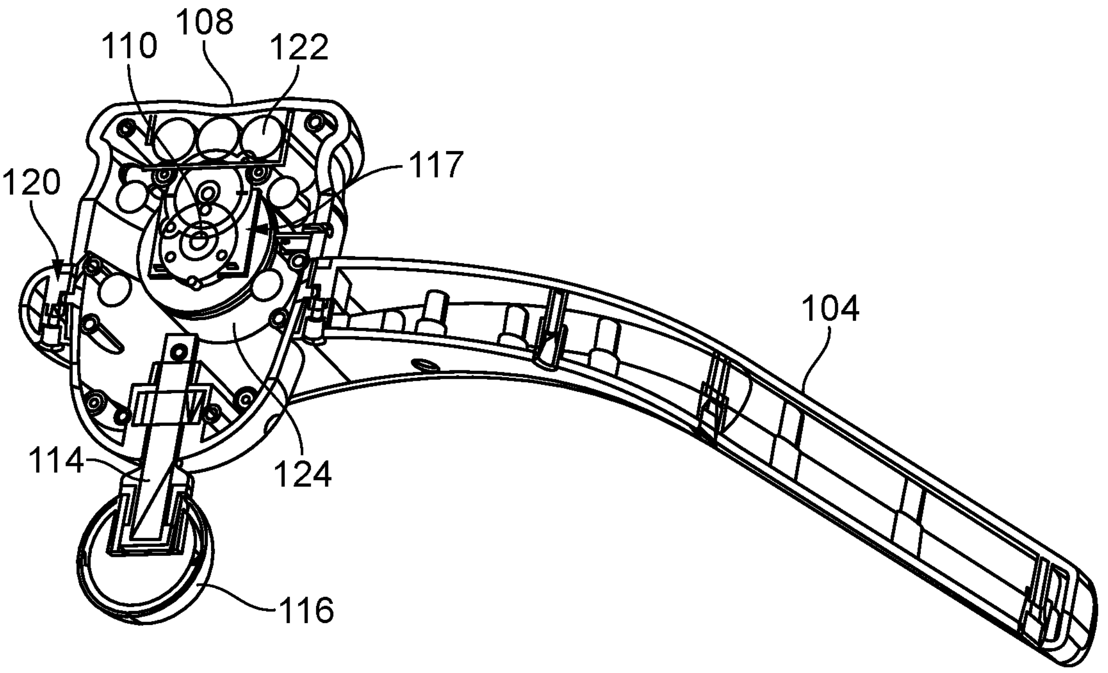

Referring to FIGS. 2-3, sectional views of the mini-massager device 100 in one embodiment are disclosed. In one embodiment, the mini-massager device 100 comprises a main body shell 108 having an annular shaped structure and a drive system 117. In one embodiment, the drive system 117 is securely disposed inside the main body shell 108. In one embodiment, the drive system 117 further comprises a spindle/rotating spindle 110, a spindle arm 112, a drive shaft 114, and an electrical motor 124. In one embodiment, the spindle 110 is rotatably connected to the electrical motor 124, which is securely and operatively disposed inside the main body shell 108. In one embodiment, the drive shaft 114 having a first end and a second end, wherein the first end is securely and movably connected to the spindle 110 by connecting to one end of a movable arm 128 (shown in FIG. 4) and the second end is connected to the massage head 116, thereby enabling reciprocating motion for massaging the body of the user, for example, user's palm.

In one embodiment, the mini-massager device 100 further comprises one or more batteries 122, securely disposed inside the main body shell 108. The batteries 122 are configured to provide electrical power for operating the mini-massager device 100. In one embodiment, the elongated handle 104 is securely positioned and locked to the main body shell 108 via pressure tabs or locking tabs 120. In one embodiment, the handle snap connection with pressure tabs 120 is actuated to disengage the main body 108 from the handle 104. In one embodiment, the mini-massager device 100 includes a massage member having a head that may be configured to snap-fasten in an annular groove formed on an inside surface of the handle frame. In one embodiment, the massage head 116 is securely and movably connected to the second end of the drive shaft 114 of the mini-massager device 100 via locking tabs 118. In one embodiment, the massage head 116 is attached by rotating two tabs 118 into corresponding slots and locking it in place. In some embodiments, the massage head 116 is securely and movably connected to the second end of the drive shaft 114 of the mini-massager device 100 using one or more fasteners. In some embodiments, the rotary movement of the massage head 116 being controlled by a stepping mechanism with an adjustable pulse ratio from forward to reverse. In one embodiment, the massage head 116 could be a reciprocating ball that creates a percussive affect.

Figure 4:
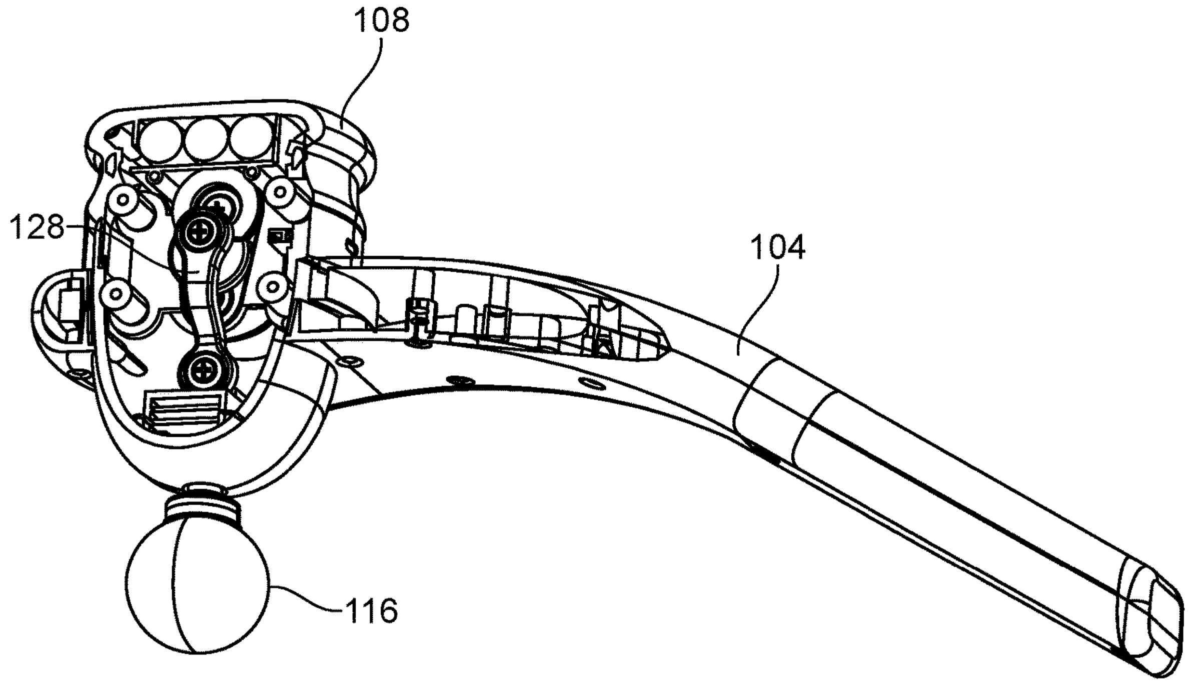
FIG. 4 shows a sectional perspective view of the mini-massager device comprises a movable arm connected to a spindle and a drive shaft in one embodiment of the present invention.

Referring to FIG. 4, the movable arm 128 connected to the spindle 110 and the drive shaft 114 in one embodiment is disclosed. In one embodiment, the movable arm 128 is configured to securely connect to the spindle 110 and the drive shaft 114 (shown in FIG. 3). In one embodiment, the drive shaft 114 is configured to reciprocate in response to activation of the electrical motor 124. In one embodiment, the drive system 117 is configured to convert the rotary motion of the electrical motor 124 into reciprocating motion when the mini-massager device 100 is turned on by the user using the power switch 115 (shown in FIG. 1).

Figure 5:
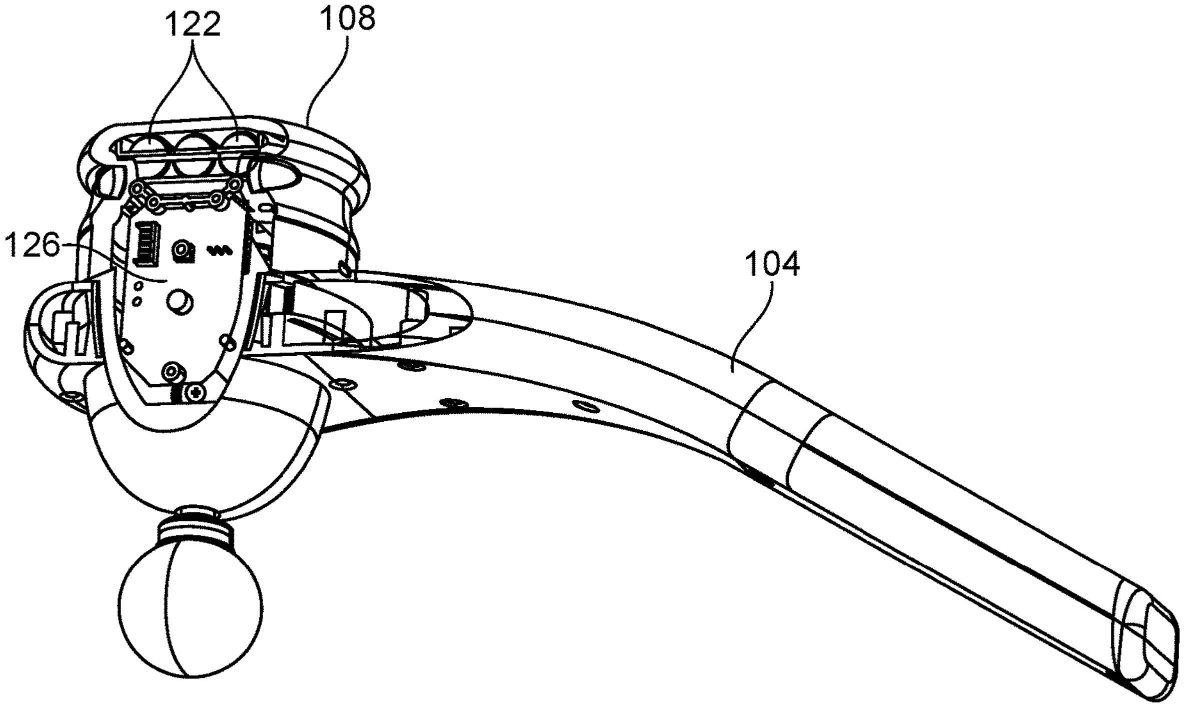
FIG. 5 shows a perspective view of the mini-massager device provided with a printed circuit board (PCB) in one embodiment of the present invention.

Referring to FIG. 5, the perspective view of the mini-massager device 100 provided with a printed circuit board (PCB) 126 in one embodiment is disclosed. In one embodiment, the PCB board 126 is configured to mechanically support the electrical connections and electrically connect the indicator 113, power switch/control switch 115, batteries 122, and the electrical motor 124 using conductive tracks and wires.

Figure 6:
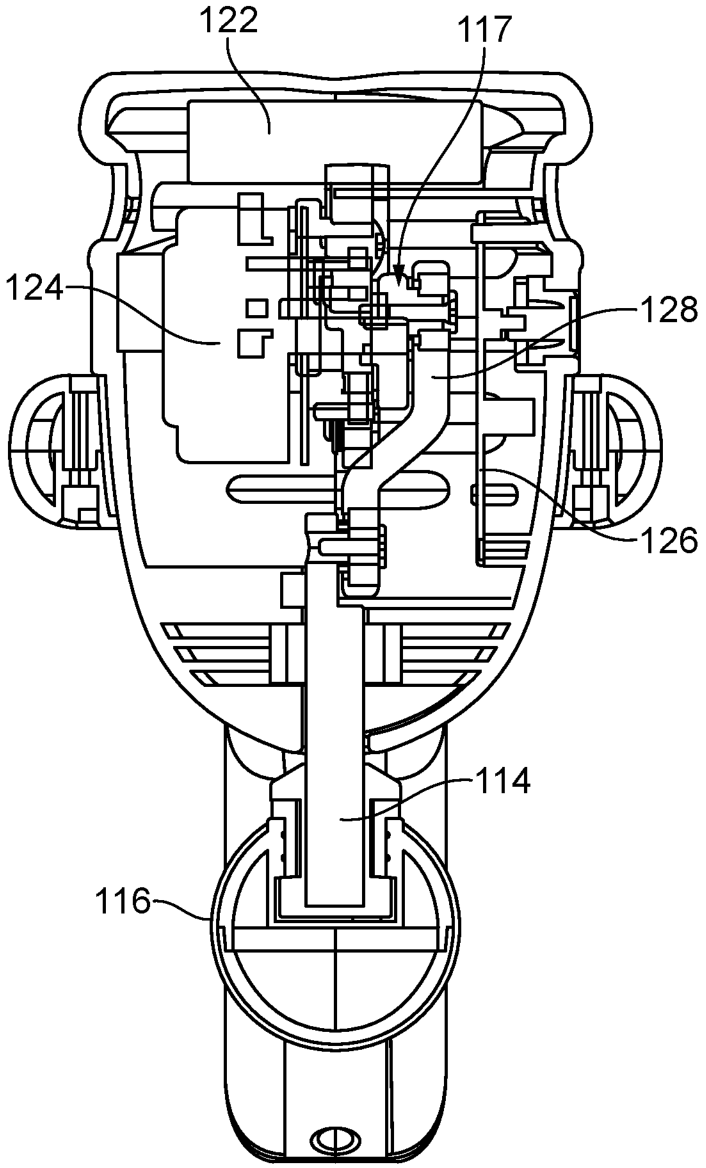
FIGS. 6-7 show front sectional views of a drive system of the mini-massager device in one embodiment of the present invention.
Figure 7:
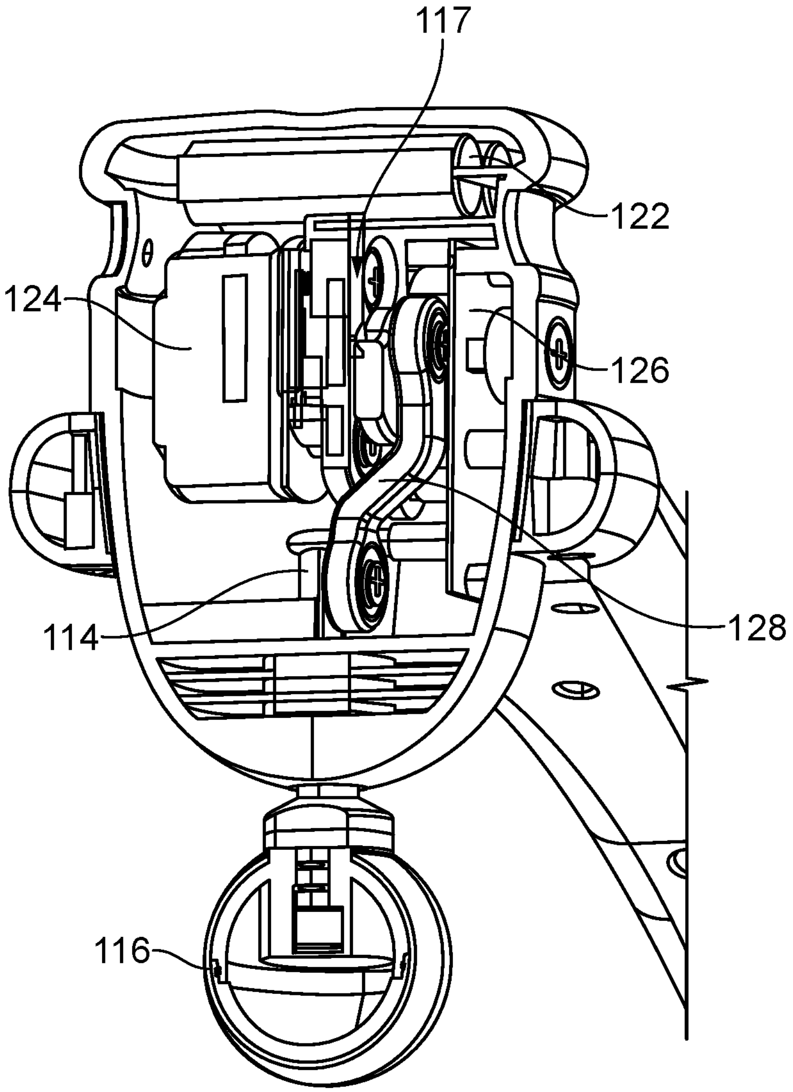

Referring to FIGS. 6-7, the drive system 117 of the mini-massager device 100 in one embodiment is disclosed. In one embodiment, the drive system 117 could convert the rotary motion of the electrical motor 124 into reciprocating motion when the mini-massager device 100 is turned on by the user using the power switch 115. The movable arm 128 is securely and movably connected to the spindle 110 at one end and the drive shaft 114 at another end. In one embodiment, the movable arm 128 may move through a predetermined range of reciprocation. In some embodiments, the movable arm 128 could be adjustable through a variable range of reciprocation.

In one embodiment, the electrical motor 124 could be, but not limited to, a brushless motor with a copper bushing. In one embodiment, the batteries 122 could be, but not limited to, lithium batteries having a capacity range from about, but not limited to, 800 to 2000 mAh. In one embodiment, the batteries 122 could be recharged by connecting to an electrical supply using a universal serial bus (USB) cable and an adapter. The mini-massager device 100 could be recharged quickly within, but not limited to, 1-1.5 hrs. and 2.5-3 hrs. for larger massager using USB cable and the adapter via the USB port. In one embodiment, the mini-massager device 100 is further configured to operate at a rate ranges from at least, but not limited to, 1,000 to 3200 strokes per minute. In one embodiment, the mini-massager device 100 could provide a stroke length ranges from about, but not limited to, 8 mm to 20 mm. In one embodiment, the mini-massager device 100 is further configured to generate a stall force ranges from about, but not limited to, 3 lbs to 70 lbs. In one embodiment, the mini-massager device 100 is further configured to efficiently operate at low noise less than, but not limited to, 70 dB at the operating speed of 2500 rpm.

Figure 8:
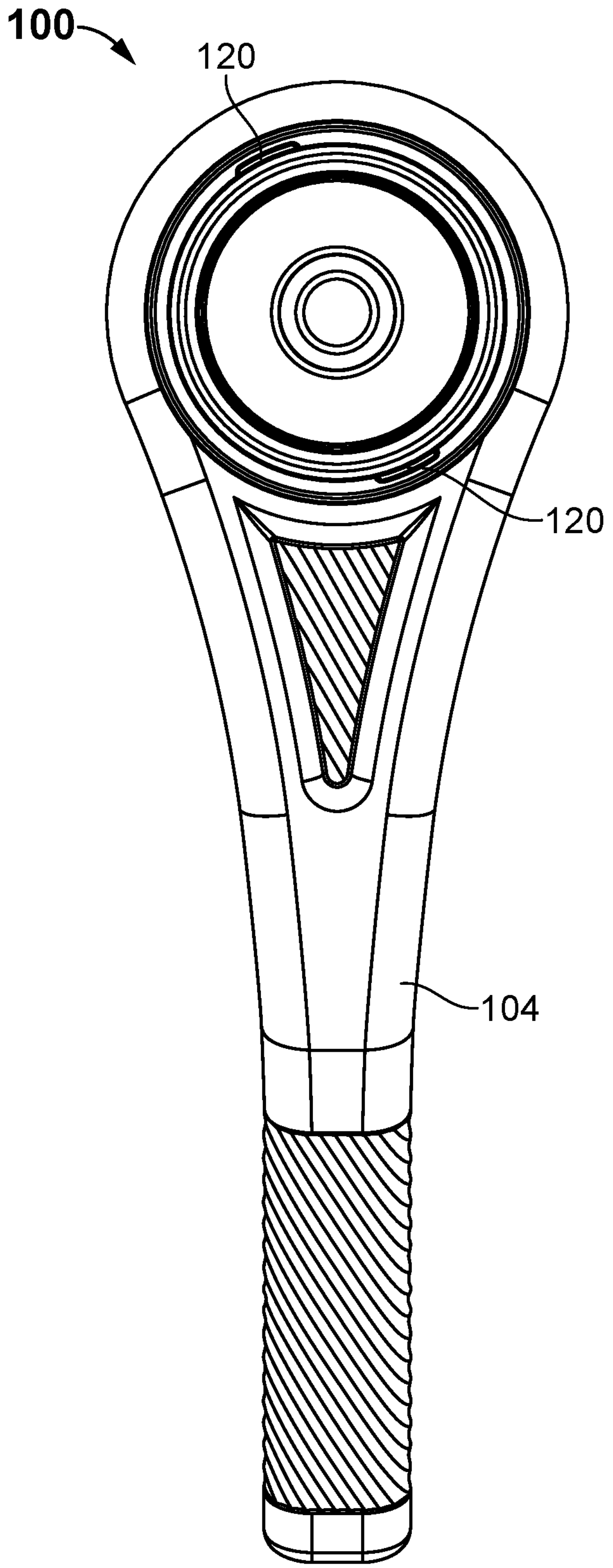
FIG. 8 shows a perspective view of the mini-massager device provided with a handle in another embodiment of the present invention.

Referring to FIG. 8, a top view of the mini-massager device 100 provided with the elongated handle 104 in another embodiment is disclosed. In one embodiment, the handle 104 could be positioned from the top portion of the mini-massager device 100 and locked to the main body shell 108 via locking tabs 120. In one embodiment, the mini-massager device 100 inserts into the handle 104 from the top down. The handle 104 comprises an opening at the center for receiving the main body shell 108 from the top portion. In one embodiment, the opening has a diameter larger than the diameter of the main body shell 108. The handle 104 is configured to enable the user to conveniently and comfortably hold the mini-massager device 100, thereby effectively massaging the body using the massage head 116. In an exemplary embodiment, the handle 104 could be formed with, but not limited to, a convex shape.

In one embodiment, the mini-massager device 100 is designed in different sizes to provide different stroke lengths. In an exemplary embodiment, the mini-massager device 100 is designed to provide a stroke length of about 10 mm, 8 mm and 12 mm. In an exemplary embodiment, the mini-massager device 100 is configured to operate at adjustable speeds such as 1500 rpm, 2000 rpm, and 2500 rpm. In an exemplary embodiment, the mini-massager device 100 is further configured to operate at adjustable speeds such as 1750 rpm, 2100 rpm, and 2400 rpm. In an exemplary embodiment, the stall force is about, but not limited to, 17.5 lbs at the speed of 2500 rpm, 13 lbs at the speed of 2500 rpm, and 20 lbs at the speed of 2500 rpm. In an exemplary embodiment, the operating voltage of the mini-massager device 100 is 12.6 V. In an exemplary embodiment, the battery charge time is about, but not limited, 60 minutes at the operating speed of 2500 rpm, 30 minutes at the operating speed of 2500 rpm, and 2.5 hours.

In an exemplary embodiment, the noise produced is about, but not limited to, 70 dB at the operating speed of 2500 rpm and at a distance 30 cm, 65 dB at the operating speed of 2500 rpm and at a distance 30 cm. In an exemplary embodiment, at least three batteries (lithium 18650) have a capacity of about, but not limited to, 2000 mAh and at least three batteries (lithium 14500) have a capacity of about, but not limited to, 800 mAh. In an exemplary embodiment, the electrical motor, for example, OD 55 mm brushless motor could be used, OD 43 mm brushless motor could be used, and Q*35 brushless motor could be used. In an exemplary embodiment, the weight is about, but not limited to, 1.077 kg, 0.56 kg (0.8 kg w/handle), 0.65 kg (dimensions 5.4" (147 mm)*4.3" (110 mm)*1.6" (40 mm)).

In an exemplary embodiment, the shafts are SS and SS-OD 6 mm, respectively. In an exemplary embodiment, the bushings are copper and POM (length under 10 mm). In an exemplary embodiment, the balls are basic ball, basic ball, and standard ball, respectively. In an exemplary embodiment, the number of indicators are at least one, at least one, and at least three, respectively. In an exemplary embodiment, the charging port could be a micro-USB, and a DC plug may also be provided.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A mini-massager device, comprising:

a main body shell having an annular shaped structure;

a drive system securely disposed inside the main body shell, wherein the drive system comprising, a spindle rotatably connected to an electrical motor, wherein the electrical motor is securely and operatively disposed inside the main body shell;

a drive shaft with bushings, having a first end and a second end, wherein the first end is securely and movably connected to the spindle by connecting to one end of a movable arm and the second end is connected to a massage head, thereby enabling reciprocating motion for massaging the body of the user, wherein the rotary movement of the massage head is controlled by a stepping mechanism with an adjustable pulse ratio from forward to reverse, and wherein the bushings of the drive system are made of copper and polyoxymethylene (POM), with a length of less than 10 mm;

one or more batteries securely disposed inside the main body shell, wherein the batteries are configured to provide electrical power for operating the mini-massager device, and wherein the mini-massager device is further configured to indicate battery status to indicate charge levels and operation status, and an elongated handle detachably positioned on the main body shell of the mini-massager device for enabling a user to conveniently and comfortably hold the mini-massager device, thereby effectively massaging the body using a massage head to relax muscles, soothe nerves, promote blood circulation, improve cell metabolism, and alleviate muscle soreness, wherein the elongated handle comprises an opening at the center for receiving the main body shell from a top portion of the mini-massager device, wherein the opening has a diameter larger than the diameter of the main body shell, wherein the elongated handle is positioned from the top portion of the mini-massager device and locked to the main body shell via locking tabs, wherein the locking tabs are provided on both sides of the mini-massager device to secure the elongated handle to the main body shell.

2. The mini-massager device of claim 1, wherein the first end of the drive shaft is configured to movably connected to one end of the rotating arm using one or more fasteners.

3. The mini-massager device of claim 1, wherein the massage head is securely and movably connected to the second end of the shaft of the mini-massager device using one or more fasteners.

4. The mini-massager device of claim 1, wherein the second end of the drive shaft is configured to securely connect to the massage head via locking tabs.

5. The mini-massager device of claim 1, wherein the drive system is configured to convert the rotary motion of the electrical motor into reciprocating motion when the mini-massager device is turned on by the user using a power switch.

6. The mini-massager device of claim 1, wherein the movable arm is configured to securely and movably connect to the spindle at one end and the drive shaft at another end.

7. The mini-massager device of claim 1, is further configured to operate at a rate ranges from at least 1,000 to 3200 strokes per minute and provide a stroke length ranges from about 8 mm to 20 mm, and wherein the mini-massager device is configured to adjust the throw or stroke length of the massaging head to work on larger or smaller muscle groups or deeper or shallower points of stress, with selectable stroke lengths of about 10 mm, 8 mm, and 12 mm; wherein the mini-massager device is further configured to operate at adjustable speeds, including 1500 rpm, 2000 rpm, and 2500 rpm, or 1750 rpm, 2100 rpm, and 2400 rpm.

8. The mini-massager device of claim 1, is further configured to generate a stall force ranges from about 3 lbs to 70 lbs, wherein the stall force is, 17.5 lbs at an operating speed of 2500 rpm, 13 lbs at an operating speed of 2500 rpm, and 20 lbs at an operating speed of 2500 rpm.

9. The mini-massager device of claim 1, wherein the electrical motor is a brushless motor with a copper bushing.

10. The mini-massager device of claim 1, wherein the batteries are lithium batteries having a capacity range from about 800 to 2000 mAh.

11. The mini-massager device of claim 1, wherein the batteries are recharged by connecting to an electrical supply using a universal serial bus (USB) cable and an adapter, wherein the mini-massager device has an operating voltage of 12.6 V, and recharge time of the battery is about 30 minutes at an operating speed of 2500 rpm, and 2.5 hours at a lower operating speed.

12. The mini-massager device of claim 1, further comprises an indicator for indicating battery level, wherein the indicator is a light indicator.

13. The mini-massager device of claim 1, is further configured to efficiently operate at low noise less than 70 dB at the operating speed of 2500 rpm, wherein the device produces noise levels of about 70 dB at 2500 rpm at a distance of 30 cm, or 65 dB at lower speeds.

14. The mini-massager device of claim 1, further comprises a printed circuit board (PCB) for mechanically supporting electrical connections and electrically connecting the electrical motor, batteries, a power switch/control switch, and the indicator using conductive tracks and wires.

15. The mini-massager device of claim 1, wherein the elongated handle is configured to enable the user to conveniently and comfortably hold the mini-massager device, wherein the weight of the mini-massager device with the handle is within a range of 0.56 kg to 1.07 kg, thereby effectively massaging the body using the massage head.

* * * * *